(12) United States Patent
Nakayama

(10) Patent No.: US 7,650,302 B2
(45) Date of Patent: Jan. 19, 2010

(54) NUMERICAL CALCULATION DEVICE, NUMERICAL CALCULATION METHOD, AND COMPUTER PRODUCT

(75) Inventor: Takayuki Nakayama, Kawasaki (JP)

(73) Assignees: Fujitsu Limited, Kawasaki (JP); The Bank of Tokyo-Mitsubishi UFJ, Ltd., Tokyo (JP)

(*) Notice: Subject to any disclaimer, the term of this patent is extended or adjusted under 35 U.S.C. 154(b) by 284 days.

(21) Appl. No.: 11/369,912

(22) Filed: Mar. 8, 2006

(65) Prior Publication Data

US 2006/0149661 A1 Jul. 6, 2006

Related U.S. Application Data

(63) Continuation of application No. PCT/JP03/11508, filed on Sep. 9, 2003.

(51) Int. Cl.
G06Q 40/00 (2006.01)

(52) U.S. Cl. .................................................. 705/36 R
(58) Field of Classification Search ................ 705/36 R
See application file for complete search history.

(56) References Cited

U.S. PATENT DOCUMENTS

| 6,173,276 | B1 * | 1/2001 | Kant et al. ..................... 706/50 |
| 6,546,375 | B1 * | 4/2003 | Pang et al. ..................... 705/37 |
| 6,631,392 | B1 * | 10/2003 | Jiang et al. .................. 708/498 |
| 2001/0056392 | A1 * | 12/2001 | Daughtery, III ............... 705/36 |
| 2003/0014345 | A1 * | 1/2003 | Lim .............................. 705/36 |
| 2003/0208430 | A1 * | 11/2003 | Gershon ....................... 705/36 |

FOREIGN PATENT DOCUMENTS

JP 2002-230304 8/2002

OTHER PUBLICATIONS

Alessio Farhadi, "Solving the Black-Scholes Equation," Aug. 17, 2002, www.quantnotes.com, retrieved via www.archive.com.*

Peter Carr, "A Calculator Program for Option Values and Implied Standard Deviations," *Journal of Financial Education*, Fall 1988, pp. 89-93.

Peter Carr, et al., "Simulating American Bond Options in an HJM Framework," [Online]. Feb. 26, 1998, Internet Archive (Original Address): <URL: http://www.math.nyu.edu/research/carrp/papers/pdf/hjm.pdf>.

(Continued)

*Primary Examiner*—Charles R Kyle
*Assistant Examiner*—David L Wood
(74) *Attorney, Agent, or Firm*—Staas & Halsey LLP

(57) ABSTRACT

A numerical calculation device calculates a value of any one of an option premium or an option risk indicator or both related to a barrier option. The numerical calculation device includes a magnitude relation judging unit that judges a magnitude relation between a value of a volatility used for a calculation of the option risk indicator and a threshold value of the volatility at which it is predicted in advance that an overflow occurs, and a calculation executing unit that executes, when it is judged that the value of the volatility is equal to or larger than the threshold value, the calculation of the option risk indicator using a specific approximation formula and calculation procedure.

9 Claims, 4 Drawing Sheets

OTHER PUBLICATIONS

Plauger, P.J., The Standard C Library. Prentice-Hall (Englewood Cliffs, US), Jul. 1, 1991, ISBN 0-13-131509-9., Chapter 4, Section Using <float.h>', pp. 62 to 64.

Joe Lemieux, "Fixed-Point Math in C," *Embedded Systems Programming*, vol. 14, No. 4, Apr. 2001, pp. 44-50.

Arvid C. Johnson, "The Cumulative Distribution Function of the Right-Truncated Normal Distribution," [Online]. May 3, 2003, <URL: http://domain.dom.edu/faculty/ajohnson/rtn.pdf>.

De Rosa D.F. Options on Foreign Exchange. First Edition, Toyo Keizai Inc. (Japan), Nov. 16, 2000, pp. 163-189, "Chapter 9 Currency Options with Barrier".

Plauger, P.J., The Standard C Library. Prentice-Hall, Inc. (USA), Jul. 11, 1991, pp. 62-64.

NEC Corporation. Super-UX Fortran 77/SX Programming Guide. 6th Edition, NEC Corporation (Japan), Dec. 1997, pp. 156-164, "5.4 Notes on Use of Optimization Functions".

Sugiyama Kohichi, "Statistical Analysis of Personal Computer", 1st Edition, Asakura Publishing Co. Ltd. (Japan), Feb. 20, 1984, pp. 26-30, "2.3 Upper Probability and Percent Point in Normal Distribution".

Abramowitz, Milton et al., "Handbook of Mathematical Functions", 10th printing with corrections, National Bureau of Standards, (USA), Oct. 1970, p. 19 "3.10 Theorems on Continued Fractions", pp. 931-935, "26.2 Normal or Gaussian Probability Functions".

Hill, I.D. et al., "Algorithm 304: Normal Curve Integral", Communications of the ACM, vol. 10, Section 6, pp. 374-375.

Spinellis, D. Code Quality: Identification Method of Non-functional Characteristics by Code Reading. 1st Edition, Mainichi Communications (Japan), Jun. 10, 2007, pp. 505-507, "8.3 Overflow".

Japanese Office Action issue on Nov. 18, 2008 in corresponding Japanese Patent Application No. 2005-508898.

Norton, Robert M., "Pocket-Calculator Approximation for Areas Under the Standard Normal Curve", The American Statistician, vol. 43, No. 1, 1989.02, pp. 24-26.

Japanese Patent Office Action mailed May 12, 2009 for corresponding Japanese Patent Application No. 2005-508898.

Dr. Jorn Rank, "Stochastische Prozesse in der Finanzmathematik," [Online]. Nov. 17, 2000, <URL: http://www.d-fine.de/pool/bibliothek/v1_jra_ stotch 5.pdf>.

* cited by examiner

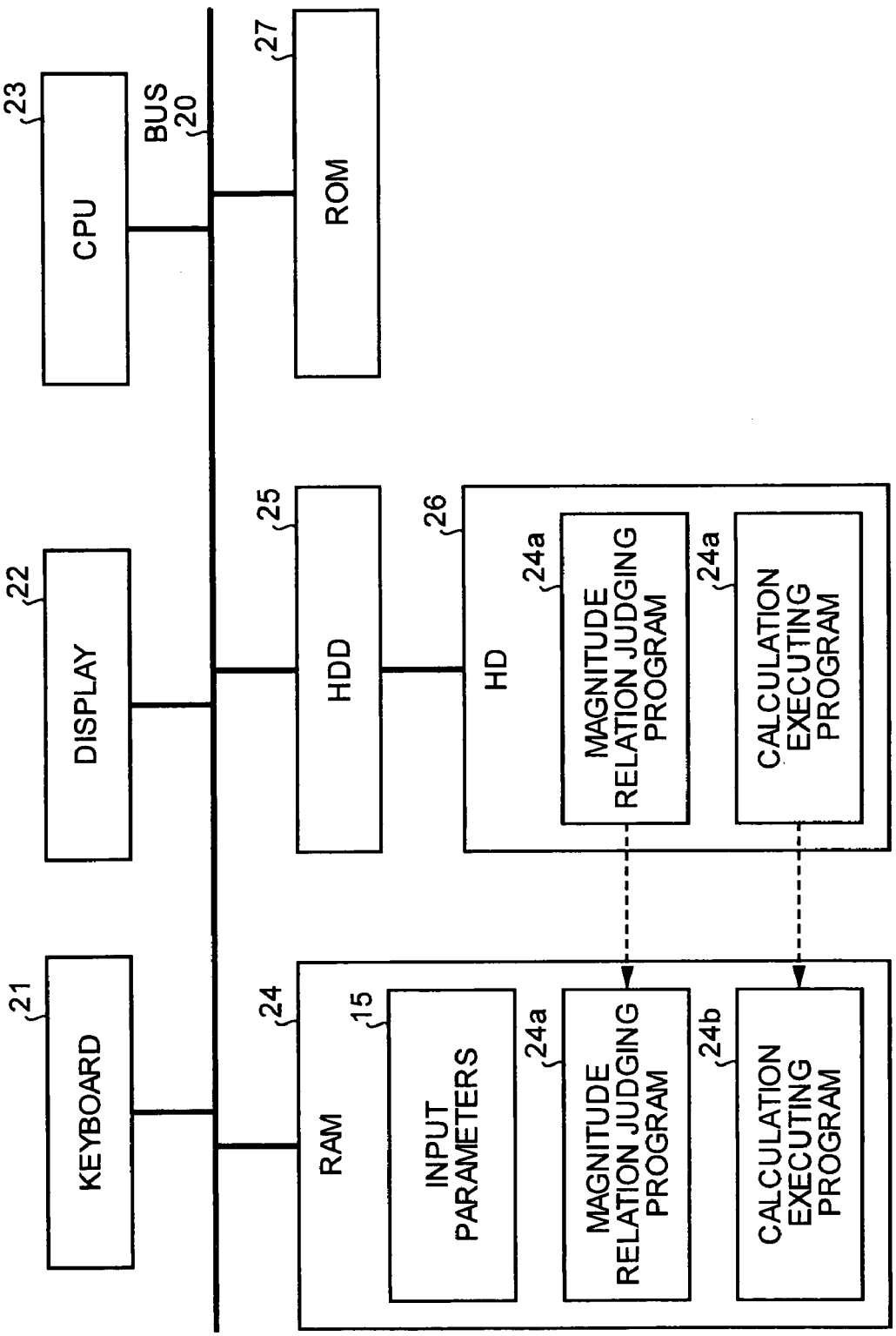

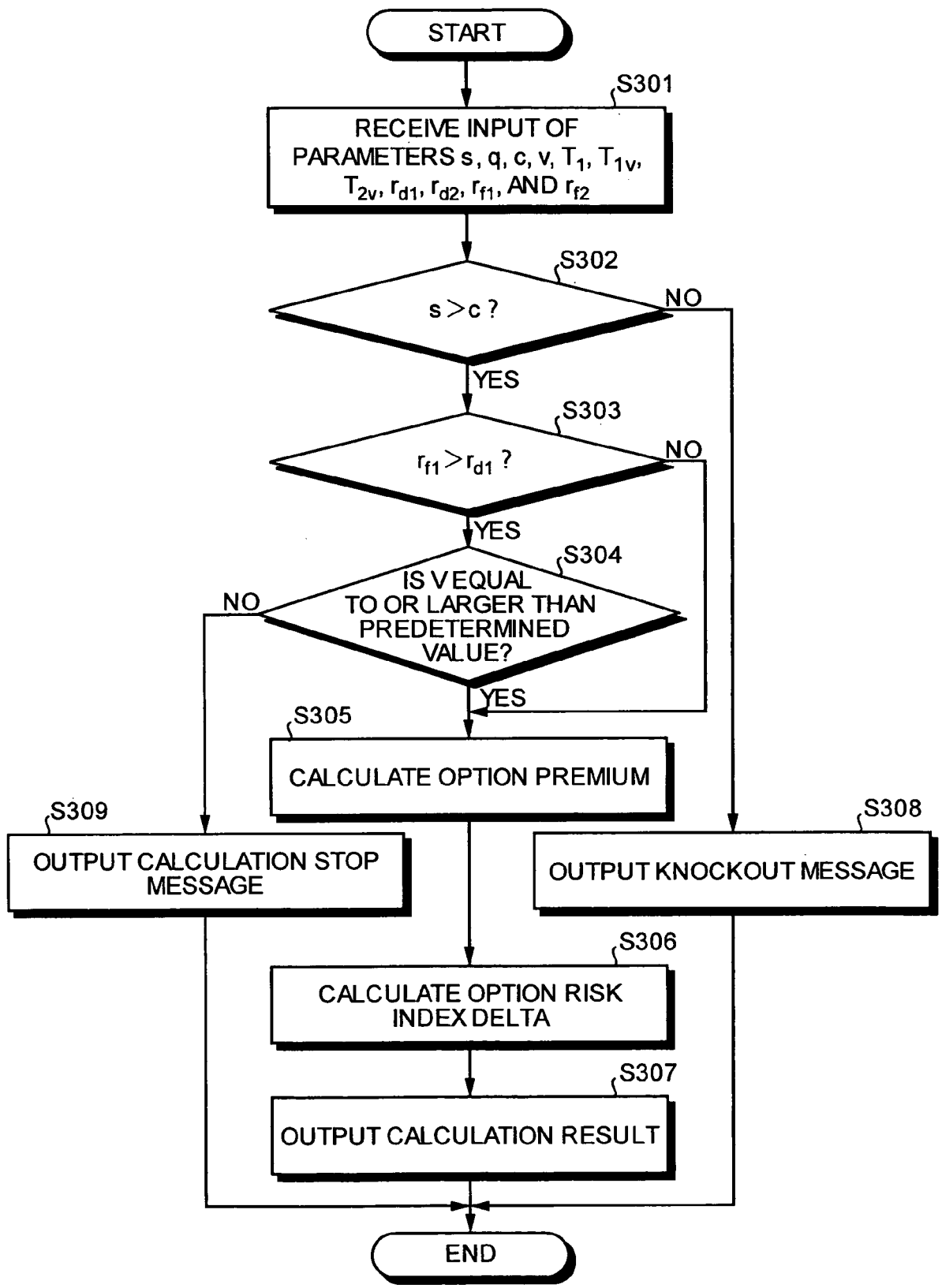

FIG.4

| | |
|---|---|
| SPOT RATE, s | 119.8 |
| STRIKE PRICE, q | 115 |
| BARRIER, c | 116.1 |
| VOLATILITY, v | 0.002 |
| PERIOD FROM AGREEMENT DATE TO EXERCISE DATE (UNIT: YEAR), $T_1$ | 0.00273973 |
| PERIOD FROM SPOT DATE OF AGREEMENT DATE TO SPOT DATE OF EXERCISE DATE (UNIT: YEAR), $T_{1v}$ | 0.00273973 |
| PERIOD FROM SPOT DATE OF AGREEMENT DATE TO DELIVERY DATE (UNIT: YEAR), $T_{2v}$ | 0.00273973 |
| INTEREST RATE OF CURRENCY 1 CORRESPONDING TO PERIOD $T_{1v}$, $r_{d1}$ | 0.005 |
| INTEREST RATE OF CURRENCY 1 CORRESPONDING TO PERIOD $T_{2v}$, $r_{d2}$ | 0.005 |
| INTEREST RATE OF CURRENCY 2 CORRESPONDING TO PERIOD $T_{1v}$, $r_{f1}$ | 0.05 |
| INTEREST RATE OF CURRENCY 2 CORRESPONDING TO PERIOD $T_{2v}$, $r_{f2}$ | 0.05 |

NUMERICAL CALCULATION DEVICE, NUMERICAL CALCULATION METHOD, AND COMPUTER PRODUCT

This application is a continuing application, filed under 35 U.S.C. §111 (a), of International Application PCT/JP2003/011508, filed Sep. 9, 2003.

BACKGROUND OF THE INVENTION

1. Field of the Invention

The present invention relates to a technology for calculating a value of any one of an option premium and an option risk indicator or both related to a barrier option.

2. Description of the Related Art

Conventionally, option trading for trading a right (an option) for trading specific underlying assets like stocks, credits, and currencies in specific dates and periods at prices decided advance has been widely performed. A right for buying an option is called a call option and a right for selling an option is called a put option.

A barrier option and the like, which are more developed forms of these options, have also been started to be traded. The barrier option is an option in which a right for exercising an option accrues or lapses when an underlying asset value reaches a fixed price (a barrier).

For inventors investing in the option trading, to improve investment effects, it is extremely important to accurately predict trading prices (option premiums) of such options.

Japanese Patent Application Laid-Open No. 2002-230304 discloses a premium calculating method that can approximately calculate option premiums in markets of the barrier options and the like satisfactorily based on option risk indicators like Vega and Vanna.

However, in the conventional technology disclosed in Japanese Patent Application Laid-Open No. 2002-230304, when an option premium or an option risk indicator is numerically calculated, it is likely that an execution result of the numerical calculation exceeds a maximum value of the number, which a computer can handle, to cause an overflow. Thus, the calculation executed to that point is wasted.

In the barrier option, power function including an inverse $1/v^2$ of a square of a volatility v frequently appears in an exponential part in an equation for the option premium or a formula for calculating the option risk indicator. When a value of the volatility becomes extremely small, a value of this exponential part increases and a value of the power function becomes extremely large. As a result, the overflow easily occurs.

A product of an equation including the inverse $1/v^2$ of the square of the volatility v and the power function frequently appears in the equation for the option risk indicator. When a value of the volatility becomes extremely small, a value of the power function increases and a value of the equation including $1/v^2$ also increases. As a result, the overflow more easily occurs.

When the overflow occurs in this way, time and processing consumed for execution of the calculation of the option premium and the option risk indicator are wasted. In particular, this causes a significant problem in repeating the calculation while changing various parameters. This causes more marked problem when the calculation is repeatedly executed in an electric calculator, a portable terminal like a Personal Digital Assistance (PDA), and the like that have relatively low performance of a CPU.

SUMMARY OF THE INVENTION

It is an object of the present invention to at least solve the problems in the conventional technology.

According to an aspect of the present invention, a numerical calculation device that calculates a value of any one of an option premium and an option risk indicator or both related to a barrier option including a magnitude relation judging unit that judges a magnitude relation between a value of a volatility used for the calculation of any one of the option premium and the option risk indicator or both related to the barrier option and a predetermined value; and a calculation executing unit that executes, when it is judged by the magnitude relation judging unit that the value of the volatility is larger than or the same as the predetermined value, a calculation of the value of any one of the option premium and the option risk indicator or both related to the barrier option.

According to another aspect of the present invention, a numerical calculation method of calculating a value of any one of an option premium and an option risk indicator or both related to a barrier option, including judging a magnitude relation between a value of a volatility used for the calculation of any one of the option premium and the option risk indicator or both related to the barrier option and a predetermined value; and executing, when it is judged by the magnitude relation judging unit that the value of the volatility is larger than or the same as the predetermined value, a calculation of the value of any one of the option premium and the option risk indicator or both related to the barrier option.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a hardware diagram of the numerical calculation device according to the embodiment;

FIG. 3 is a flowchart of a processing procedure of numerical calculation processing performed by the numerical calculation device shown in FIG. 1; and FIG. 4 is a table showing an example of various parameters substituted in an equation for Delta.

DETAILED DESCRIPTION OF THE PREFERRED EMBODIMENTS

Figure 1:
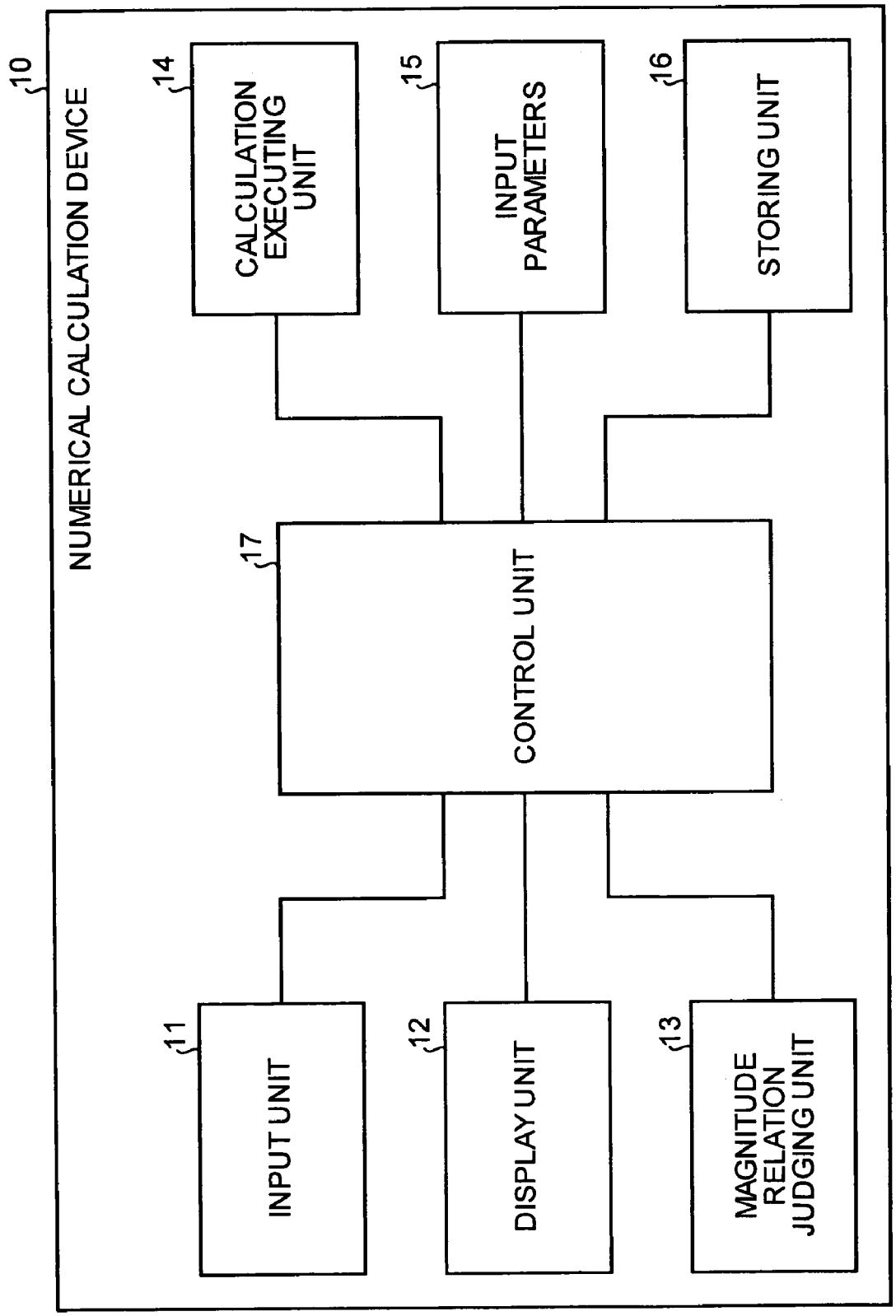
FIG. 1 is a functional block diagram of a numerical calculation device according to an embodiment of the present invention.

Exemplary embodiments of the present invention are explained in detail below with reference to the accompanying drawings. In this explanation, the present invention is applied to a calculation of Delta that is an option risk indicator of a down-and-out call option with a currency set as an underlying asset.

The down-and-out call option is a kind of a barrier option and is a call option in which a right of an option lapses (is knocked out) when an underlying asset price reaches a fixed price (a barrier) set lower than an initial underlying asset value.

An option premium of this down-and-out call option is calculated by the following equations:

$$p = se^{-r_{f2}T_{2v}}\left\{N(d_1) - \left(\frac{s}{c}\right)^{\frac{2(r_{f1}-r_{d1})T_{1v}}{v^2 T_1}-1} N(d_2)\right\} - \quad (2)$$

$$qe^{-r_{f2}T_{2v}}\left\{N(d_3) - \left(\frac{s}{c}\right)^{\frac{2(r_{f1}-r_{d1})T_{1v}}{v^2 T_1}+1} N(d_4)\right\}$$

$$d_1 = \frac{1}{v\sqrt{T_1}}\left\{\log\left(\frac{s}{q}\right) + (r_{d2} - r_{f2})T_{2v} + \frac{v^2 T_1}{2}\right\} \quad (3)$$

$$d_2 = \frac{1}{v\sqrt{T_1}}\left\{\log\left(\frac{c^2}{qs}\right) + (r_{d2} - r_{f2})T_{2v} + \frac{v^2 T_1}{2}\right\} \quad (4)$$

$$d_3 = \frac{1}{v\sqrt{T_1}}\left\{\log\left(\frac{s}{q}\right) + (r_{d2} - r_{f2})T_{2v} - \frac{v^2 T_1}{2}\right\} \quad (5)$$

$$d_4 = \frac{1}{v\sqrt{T_1}}\left\{\log\left(\frac{c^2}{qs}\right) + (r_{d2} - r_{f2})T_{2v} - \frac{v^2 T_1}{2}\right\} \quad (6)$$

In these equations, p is an option premium, s is a spot rate, q is a strike price, v is a volatility, $T_1$ is a period from an agreement date to an exercise date (unit: year), $T_{1v}$ is a period from a spot date of the agreement date to a spot date of the exercise date (unit:year), $T_{2v}$ is a period from the spot date of the agreement date to a delivery date (unit: year), $r_{d1}$ is an interest rate of a currency 1 (e.g., Japanese yen) corresponding to the period $T_{1v}$, $r_{d2}$ is an interest rate of the currency 1 corresponding to the period $T_{2v}$, $r_{f1}$ is an interest rate of a currency 2 (e.g., US dollar) corresponding to the period of $T_{1v}$, and $r_{f2}$ is an interest rate of the currency 2 corresponding to the period $T_{2v}$.

Delta ($\Delta$) is a value obtained by partially differentiating the equation for the option premium with the spot rate s and is calculated by the following equation.

$$\Delta = \frac{\partial p}{\partial s} \quad (7)$$

$$= e^{r_{f2}T_{2v}}\left\{N(d_1) - \left(\frac{s}{c}\right)^{\frac{2(r_{f1}-r_{d1})T_{1v}}{v^2 T_1}-1} N(d_2)\right\} +$$

$$e^{-r_{f2}T_{2v}}\left[\begin{array}{c}\frac{1}{v\sqrt{2\pi T_1}}e^{-\frac{d_1^2}{2}} - \left\{\frac{2(r_{f1}-r_{d1})T_{1v}}{v^2 T_1}-1\right\} \\ \left(\frac{s}{c}\right)^{\frac{2(r_{f1}-r_{d1})T_{1v}}{v^2 T_1}-1} \\ N(d_2) + \frac{1}{v\sqrt{2\pi T_1}}e^{-\frac{d_2^2}{2}}\left(\frac{s}{c}\right)^{\frac{2(r_{f1}-r_{d1})T_{1v}}{v^2 T_1}-1}\end{array}\right] -$$

$$\frac{qe^{-r_{f2}T_{2v}}}{s}$$

$$\left[\begin{array}{c}\frac{1}{v\sqrt{2\pi T_1}}e^{-\frac{d_3^2}{2}} - \left\{\frac{2(r_{f1}-r_{d1})T_{1v}}{v^2 T_1}+1\right\} \\ \left(\frac{s}{c}\right)^{\frac{2(r_{f1}-r_{d1})T_{1v}}{v^2 T_1}+1} N(d_4) + \\ \frac{1}{v\sqrt{2\pi T_1}}e^{-\frac{d_4^2}{2}}\left(\frac{s}{c}\right)^{\frac{2(r_{f1}-r_{d1})T_{1v}}{v^2 T_1}+1}\end{array}\right]$$

FIG. 1 is a functional block diagram of the constitution of the numerical calculation device according to this embodiment. A numerical calculation device 10 judges, before calculating a value of Delta according to Equation (7), whether a value of the volatility v is equal to or larger than a predetermined value. When the value of the volatility v is equal to or larger than the predetermined value, the numerical calculation device 10 executes the calculation. In this embodiment, the numerical calculation device 10 executes the calculation when the value of the volatility v is equal to or larger than the predetermined value. However, the numerical calculation device 10 may execute the calculation when the value of the volatility v is larger than the predetermined value (not equal to the predetermined value).

For example, the following equation appears in Equation (7).

$$\left\{\frac{2(r_{f1}-r_{d1})T_{1v}}{v^2 T_1} - 1\right\}\left(\frac{s}{c}\right)^{\frac{2(r_{f1}-r_{d1})T_{1v}}{v^2 T_1}-1} \quad (8)$$

An exponential part of power function $$\left(\frac{s}{c}\right)^{\frac{2(r_{f1}-r_{d1})T_{1v}}{v^2 T_1}-1} \quad (9)$$

included in Equation (8) includes an inverse $1/v^2$ of a square of the volatility v. Thus, a value of the exponential part is large when a value of the volatility v is extremely small. As a result, a calculation value of the power becomes extremely large and an overflow easily occurs.

Moreover, a calculation of a value of a production of power function (9) and the following equation is executed.

$$\frac{2(r_{f1}-r_{d1})T_{1v}}{v^2 T_1} - 1 \quad (10)$$

Since Equation (10) also includes the inverse $1/v^2$ of the square of the volatility v, a value of the equation becomes large when a value of the volatility v is extremely small. This tends to cause an overflow.

Thus, in the numerical calculation device 10, it is possible to determine, by judging whether a value of the volatility v is equal to or larger than the predetermined value, whether a calculation of Delta should be performed. It is possible to prevent occurrence of an overflow and a waste of a calculation when the value of the volatility v is extremely small.

When the numerical calculation device 10 calculates a value of a product of Equation (10), Equation (9), and an equation $N(d_2)$ of a cumulative density function with respect to a standard normal distribution, for example, a value of the following equation, $$\left\{\frac{2(r_{f1}-r_{d1})T_{1v}}{v^2 T_1} - 1\right\}\left(\frac{s}{c}\right)^{\frac{2(r_{f1}-r_{d1})T_{1v}}{v^2 T_1}-1} N(d_2) \quad (11)$$

the numerical calculation device 10 performs processing for, first, calculating a product of values of Equation (9) and the equation $N(d_2)$ of the cumulative density function $$\left(\frac{S}{c}\right)^{\frac{2(r_{f1}-r_{d1})T_{1v}}{v^2 T_1}-1} N(d_2) \quad (12)$$

and multiplying a result of the calculation by a value of Equation (10). Consequently, since a value of the equation for the cumulative density function is in a range of 0 to 1, it is possible to prevent an overflow from occurring even when a value of Equation (9) is close to a maximum number that a computer can handle. An equation, by which Equation (12) is multiplied, is not limited to Equation (10) and may be other equations.

The numerical calculation device 10 includes an input unit 11, a display unit 12, a magnitude relation judging unit 13, a calculation executing unit 14, input parameters 15, a storing unit 16, and a control unit 17. The input unit 11 is an input device like a keyboard or a mouse and is means for inputting parameters necessary for calculations of an option premium and Delta. The display unit 12 is a display device like a display and displays a calculation result and the like.

The magnitude relation judging unit 13 is a judging unit that judges a magnitude relation between a value of a volatility, input of which is received, and a predetermined value. This predetermined value serves as a threshold value for judging whether calculations of an option premium and Delta should be performed. The predetermined value is set to a numerical value with which it is possible to prevent an overflow from being caused because of a small volatility.

The calculation executing unit 14 is an executing unit that executes calculations of an option premium and Delta based on parameters, inputs of which are received. In the equation for Delta, when a value of a product of a predetermined equation, power function, and an equation for a cumulative density function is calculated, processing for, first, calculating a value of a product of the power function and the equation for the cumulative density function and multiplying a result of the calculation by a value of the predetermined equation is performed.

The calculation of a value of the equation for the cumulative density function is performed using approximation formulae of the following equations.

$$N(d) = \frac{1}{\sqrt{2\pi}} \int_{-\infty}^{d} e^{-\frac{x^2}{2}} dx \cong \begin{cases} -\frac{1}{\sqrt{2\pi}\,d} e^{-\frac{d^2}{2}}, & \text{when } d < -\sqrt{a} \quad (13) \\ 1 - \frac{1}{\sqrt{2\pi}\,d} e^{-\frac{d^2}{2}}, & \text{when } d > \sqrt{a} \quad (14) \end{cases}$$

where a is a predetermined positive number In the approximation formulae, "a" is a predetermined positive number defining a range of "d" to which this approximation formula can be applied. It is possible to arbitrarily set "a". When "a" is large, higher accuracy of approximation can be obtained. It is proved later that the approximation formulae of Equation (13) and Equation (14) are established.

When Equation (13) and Equation (14) are used, it is possible to calculate a product of power function $x^y$ and the equation for the cumulative density function as follows.

$$x^y \times N(d) = \begin{cases} -\frac{1}{\sqrt{2\pi}\,d} e^{y\log x - \frac{d^2}{2}}, & \text{when } d < -\sqrt{a} \quad (15) \\ x^y - \frac{1}{\sqrt{2\pi}\,d} e^{y\log x - \frac{d^2}{2}}, & \text{when } d > \sqrt{a} \quad (16) \end{cases}$$

As an approximation formula of the cumulative density function, the following approximation formula (1972) by Abramowitz and Stegun is known.

$$N(d) \cong \begin{cases} 1 - \frac{1}{\sqrt{2\pi}} e^{-\frac{d^2}{2}} \left(\frac{B_1}{b} - \frac{B_2}{b^2} + \frac{B_3}{b^3} - \frac{B_4}{b^4} + \frac{B_5}{b^5}\right), & \text{when } d < 0 \quad (17) \\ \frac{1}{\sqrt{2\pi}} e^{-\frac{d^2}{2}} \left(\frac{B_1}{b} - \frac{B_2}{b^2} + \frac{B_3}{b^3} - \frac{B_4}{b^4} + \frac{B_5}{b^5}\right), & \text{when } d \geq 0 \quad (18) \end{cases}$$

where
b=1+0.2316419d
$B_1$=0.319381530
$B_2$=0.356563782
$B_3$=1.781477937
$B_4$=1.821255978
$B_5$=1.330274429

However, calculation can be easily, efficiently, and quickly performed using Equation (13) and Equation (14) than with Equation (17) and Equation (18). Although the approximation formulae of Equation (13) and Equation (14) are used in this embodiment, other approximation formulae of Equation (17) and Equation (18) and the like may be used to perform calculation.

The input parameters 15 are parameters necessary for calculations of an option premium and Delta and are respective parameters of the option premium p, the spot rate s, the strike price q, the barrier c, the volatility v, the period $T_1$ from an agreement date to an exercise date, the period $T_{1v}$ from a spot date of the agreement date to a spot date of the exercise date, the period $T_{2v}$ from the spot date of the agreement date to a delivery date, the interest rate $r_{d1}$ of the currency 1 corresponding to the period $T_{1v}$, the interest rate $r_{d2}$ of the currency 1 corresponding to the period $T_{2v}$, the interest rate $r_{f1}$ of the currency 2 corresponding to the period $T_{1v}$, and the interest rate $r_{f2}$ of the currency 2 corresponding to the period $T_{2v}$, inputs of which are received.

The storing unit 16 is a secondary storing device like a hard disk device. A computer program for performing calculations of an option premium and Delta and the like are stored in the storing unit 16. The control unit 17 is a control unit that controls the entire numerical calculation device 10 and is a control unit that manages exchange of various data among the respective functional units and the like.

It is proved here that Equation (13) and Equation (14) can approximate, with sufficient accuracy, the equation for the cumulative density function with respect to the standard normal distribution. First, it is proved that the following equations are established.

$$-\frac{1}{d} e^{-\frac{d^2}{2}} = \int_{-\infty}^{d} \left(1 + \frac{1}{x^2}\right) e^{-\frac{x^2}{2}} dx \quad (19)$$

-continued $$\frac{1}{d}e^{-\frac{d^2}{2}} = \int_d^\infty \left(1 + \frac{1}{x^2}\right) e^{-\frac{x^2}{2}} dx \quad (20)$$

Since $$\frac{d}{dx}\left(-\frac{1}{x}e^{-\frac{x^2}{2}}\right) = \left(1 + \frac{1}{x^2}\right)e^{-\frac{x^2}{2}} \quad (21)$$

is established, Equation (19) and Equation (20) can be proved by the following equations.

$$\int_{-\infty}^d \left(1 + \frac{1}{x^2}\right) e^{-\frac{x^2}{2}} dx = \left[-\frac{1}{x}e^{-\frac{x^2}{2}}\right]_{-\infty}^d = -\frac{1}{d}e^{-\frac{d^2}{2}} \quad (22)$$

$$\int_d^\infty \left(1 + \frac{1}{x^2}\right) e^{-\frac{x^2}{2}} dx = \left[-\frac{1}{x}e^{-\frac{x^2}{2}}\right]_d^\infty = \frac{1}{d}e^{-\frac{d^2}{2}} \quad (23)$$

It is proved that the following equation is established.

$$\frac{1}{\sqrt{2\pi}} \int_{-\infty}^\infty e^{-\frac{x^2}{2}} dx = 1 \quad (24)$$

Equation (24) is immediately obtained by applying transformation of variables of $$y = \frac{x}{\sqrt{2}} \quad (26)$$

to the following integration theorem.

$$\int_{-\infty}^\infty e^{-y^2} dy = \sqrt{\pi} \quad (25)$$

Equation (13) is proved. An absolute value of a difference between Equation (13) and the equation for the cumulative density function with respect to the standard normal distribution is calculated as follows.

$$\left|-\frac{1}{\sqrt{2\pi}\,d}e^{-\frac{d^2}{2}} - N(d)\right| = \left|-\frac{1}{\sqrt{2\pi}\,d}e^{-\frac{d^2}{2}} - \frac{1}{\sqrt{2\pi}}\int_{-\infty}^d e^{-\frac{x^2}{2}} dx\right| \quad (27)$$

$$= \left|\frac{1}{\sqrt{2\pi}}\int_{-\infty}^d \left(1 + \frac{1}{x^2}\right)e^{-\frac{x^2}{2}} dx - \frac{1}{\sqrt{2\pi}}\int_{-\infty}^d e^{-\frac{x^2}{2}} dx\right|$$

$$= \frac{1}{\sqrt{2\pi}}\left|\int_{-\infty}^d \frac{1}{x^2} e^{-\frac{x^2}{2}} dx\right|$$

Equation (19) is used for derivation of this equation. The following inequality is established.

$$e^{-\frac{x^2}{2}} < e^{-\frac{a}{2}}, \text{ when } x \le d < -\sqrt{a} \quad (28)$$

Thus, Equation (27)

$$< \frac{e^{-\frac{a}{2}}}{\sqrt{2\pi}}\left|\int_{-\infty}^d \frac{1}{x^2} dx\right| = -\frac{e^{-\frac{a}{2}}}{\sqrt{2\pi}\,d} < \frac{e^{-\frac{a}{2}}}{\sqrt{2\pi a}} \quad (29)$$

is obtained. For example, when "a" is 100, a value of the right side of Equation (29) is $7.69 \times 10^{-24}$. Thus, it is seen that Equation (13) approximates the cumulative density function with sufficient accuracy in terms of a calculation.

Subsequently, Equation (14) is proved. An absolute value of a difference between Equation (14) and the equation for the cumulative density function with respect to the standard normal distribution is calculated as follows.

$$\left|\left(1 - \frac{1}{\sqrt{2\pi}\,d}e^{-\frac{d^2}{2}}\right) - N(d)\right| = \quad (30)$$

$$\left|\left(1 - \frac{1}{\sqrt{2\pi}\,d}e^{-\frac{d^2}{2}}\right) - \frac{1}{\sqrt{2\pi}}\int_{-\infty}^d e^{-\frac{x^2}{2}} dx\right| =$$

$$\frac{1}{\sqrt{2\pi}}\left|\int_{-\infty}^\infty e^{-\frac{x^2}{2}} dx - \int_d^\infty \left(1 + \frac{1}{x^2}\right)e^{-\frac{x^2}{2}} dx - \int_{-\infty}^d e^{-\frac{x^2}{2}} dx\right| =$$

$$\frac{1}{\sqrt{2\pi}}\left|\int_{-\infty}^d e^{-\frac{x^2}{2}} dx + \int_d^\infty e^{-\frac{x^2}{2}} dx - \int_d^\infty \left(1 + \frac{1}{x^2}\right)e^{-\frac{x^2}{2}} dx - \int_{-\infty}^d e^{-\frac{x^2}{2}} dx\right| = \frac{1}{\sqrt{2\pi}}\left|\int_d^\infty \frac{1}{x^2} e^{-\frac{x^2}{2}} dx\right|$$

Equation (20) and Equation (24) are used for derivation of this equation. The following inequality is established.

$$e^{-\frac{x^2}{2}} < e^{-\frac{a}{2}}, \text{ when } x \ge d > \sqrt{a} \quad (31)$$

Thus, Equation (30) (32)

$$< \frac{e^{-\frac{a}{2}}}{\sqrt{2\pi}}\left|\int_d^\infty \frac{1}{x^2} dx\right| = \frac{e^{-\frac{a}{2}}}{\sqrt{2\pi}\,d} < \frac{e^{-\frac{a}{2}}}{\sqrt{2\pi a}}$$

is obtained. For example, when "a" is 100, a value of the right side of Equation (32) is $7.69 \times 10^{-24}$. Thus, it is seen that Equation (14) approximates the cumulative density function with sufficient accuracy in terms of a calculation.

A hardware configuration of the numerical calculation device 10 shown in FIG. 1 will be explained below. FIG. 2 is a diagram of the hardware configuration of the numerical calculation device 10 according to this embodiment. As shown in the figure, in the numerical calculation device 10, a keyboard 21, a display 22, a CPU 23, a RAM 24, an HDD 25, and a ROM 27 are connected by a bus 20.

In a hard disk (HD) that is a storage medium subjected to storage and readout control by the HDD 25, a magnitude relation judging program 24*a* and a calculation executing program 24*b* are stored. These programs are loaded to the RAM 24. Processes of the respective programs are executed by the CPU 23. The process of the magnitude relation judging program 24*a* corresponds to the magnitude relation judging unit 13 shown in FIG. 1. The process of the calculation executing program 24*b* corresponds to the calculation executing unit 14 shown in FIG. 1.

The input parameters 15 received from the keyboard 21 are stored in the RAM 24. The CPU 23 refers to the input parameters 15, as required, to perform calculations of an option premium and Delta.

A processing procedure of numerical calculation processing performed by the numerical calculation device 10 shown in FIG. 1 is explained. FIG. 3 is a flowchart of the processing procedure of the numerical calculation processing performed by the numerical calculation device 10 shown in FIG. 1.

As shown in the figure, first, the numerical calculation device 10 receives inputs of various parameters necessary for calculation of an option premium and Delta (step S301). The numerical calculation device 10 checks whether the spot rate s is larger than the barrier c (step S302).

When the spot rate s is not larger than the barrier c ("No" at step S302), this means that a right of an option has lapsed (has been knocked out). Thus, the numerical calculation device 10 outputs a message indicating that the right of the option has been knocked out (step S308) and ends the numerical calculation processing.

When the spot rate s is larger than the barrier c ("Yes" at step S302), the numerical calculation device 10 checks whether the interest rate $r_{f1}$ of the currency 2 corresponding to the period $T_{1v}$ from a spot date of an agreement date to a spot date of an exercise date is larger than the interest rate $r_{d1}$ of the currency 1 corresponding to the period $T_{1v}$ from a spot date of an agreement date to a spot date of an exercise date (step S303). When the interest rate $r_{f1}$ of the currency 2 is larger than the interest rate $r_{d1}$ of the currency 1, this means that the exponential part of the power appearing in the equation for Delta in Equation (7) takes a positive value.

When the interest rate $r_{f1}$ of the currency 2 is not larger than the interest rate $r_{d1}$ of the currency 1 ("No" at step S303), the numerical calculation device 10 shifts to step S305. When the interest rate $r_{f1}$ of the currency 2 is larger than the interest rate $r_{d1}$ of the currency 1 ("Yes" at step S303), the numerical calculation device 10 checks whether the volatility v is equal to or larger than a predetermined value (step S304).

When the volatility v is not equal to or larger than the predetermined value ("No" at step S304), the numerical calculation device 10 outputs a calculation stop message to prevent an overflow from occurring (step S309) and ends the numerical calculation processing. When the volatility v is equal to or larger than the predetermined value ("Yes" at step S304), the numerical calculation device 10 calculates an option premium using Equations (2) to (6) (step S305).

Subsequently, the numerical calculation device 10 calculates an option risk indicator delta using Equation (7) (step S306). In calculating an option premium and Delta, when a value of a product of the predetermined Equation (10), power function (9), and Equation (13) or Equation (14) of the cumulative density function with respect to the standard normal distribution indicated by, for example, Equation (11) is calculated, first, the numerical calculation device 10 calculates a value of a product of Equation (9) and Equation (13) or Equation (14) and multiplies the value of the product by a value of Equation (10). Finally, the numerical calculation device 10 outputs a result of the calculation (step S307) and ends the numerical calculation processing.

An example of a calculation result of calculation processing for preventing an overflow is described. In this embodiment, a calculation result of calculation processing for calculating Equation (11) included in the equation for Delta in Equation (7) is explained. FIG. 4 is a table of an example of various parameters substituted in the equation for Delta.

As shown in the figure, in this example, the spot rate s is larger than the barrier c. Thus, a right of an option has not been knocked out. Since the interest rate $r_{f1}$ of the currency 2 corresponding to the period $T_{1v}$ from a spot date of an agreement date to a spot date of an exercise date is larger than the interest rate $r_{d1}$ of the currency 1 corresponding to the period $T_{1v}$ from a spot date of an agreement date to a spot date of an exercise date, the exponential part of Equation (9) takes a positive value.

When the volatility v takes an extremely small value such as "0.00008", values of the exponential part of Equation (9) and Equation (10) become extremely large and a calculation result of Equation (11) tends to indicate an overflow. Thus, when the volatility v is smaller than, for example, "0.0001", the numerical calculation device 10 performs processing not to execute a calculation of Delta.

When a value of Equation (10) is calculated using the parameters shown in FIG. 4, "22,499" is obtained. A value of Equation (9) is calculated as "$3.4661 \times 10^{306}$". A value of the cumulative density function $N(d_2)$ of the standard normal distribution calculated based on the approximation formula of Equation (13) is "0". The value of Equation (9) is a value close to a maximum number "$1.7977 \times 10^{308}$" that the computer can handle in a 64-bit floating-point calculation.

In this case, a product of the value "22,499" of Equation (10) and the value "$3.4661 \times 10^{306}$" of Equation (9) is calculated as "$7.7984 \times 10^{310}$", which exceeds the maximum number "$1.7977 \times 10^{308}$" that the computer can handle. Thus, an overflow occurs. Therefore, as indicated by Equation (12), first, a product of a value of Equation (9) of power and a value of the cumulative density function $N(d_2)$ is calculated and, then, a value of the product is multiplied by a value of Equation (10). Consequently, it is possible to calculate a value of Equation (11) as "0" without occurrence of an overflow.

As described above, in this embodiment, a magnitude relation between a value of the volatility v used for a calculation of Delta and a threshold value of the volatility v, at which it is predicted in advance that an overflow occurs, is judged. When it is judged that the value of the volatility v is equal to or larger than the threshold value, the calculation of Delta is executed. Thus, it is possible to easily and efficiently prevent occurrence of an overflow and reduce a waste of a calculation.

The embodiment of the present invention has been explained above. However, the present invention may be carried out in various different embodiments in a range of the technical idea described in claims other than the embodiment described above.

For example, in this embodiment, the present invention is applied to a calculation of Delta of a down-and-out call option with a currency set as an underlying asset. However, the present invention is not limited to this. It is also possible to apply the present invention to an equation with a stock, a credit, or the like set as an underlying asset.

It is also possible to apply the present invention to calculations of deltas of barrier options like a down-and-out put option, a down-and-in call option, a down-and-in put option, an up-and-out call option, an up-and-out put option, an up-and-in call option, and an up-and-in put option other than the down-and-out call option.

It is also possible to apply the present invention to a calculation of an option premium of a barrier option and calculations of other option risk indicators like Gamma, Theta, Vega, and Rho other than the calculation of Delta.

It is possible to manually perform all or a part of the kinds of processing explained as being automatically performed among the respective kinds of processing explained in this embodiment. It is also possible to automatically perform, with the publicly-known method, all or a part of the kinds of processing explained as manually performed. Besides, it is possible to arbitrarily change information including the processing procedures, the control procedures, the specific names, and the various data and parameters described and shown in the specification and the drawings unless specifically noted otherwise.

The respective components of the numerical calculation device 10 shown in the figures are functionally conceptual and do not always have to be physically constituted as shown in the figures. In other words, specific forms of distribution and integration of the components of the numerical calculation device 10 are not limited to those shown in the figures. It is possible to functionally or physically distribute and integrate all or a part of the components by an arbitrary unit according to various loads and states of use. For example, it is not always necessary to provide the storing unit 16 in the numerical calculation device 10. The present invention includes a constitution in which the storing unit 16 is managed on another computer apparatus and necessary data is transmitted to and received from the storing unit 16 via a network.

Moreover, all or an arbitrary part of respective processing functions performed by the respective units can be realized by a CPU or programs analyzed and executed by the CPU or can be realized as hardware according to a wired logic.

It is possible to realize the numerical calculation method explained in this embodiment by executing a program prepared in advance with a computer like a personal computer or a work station. It is possible to distribute this program via a network such as the Internet. It is also possible to execute this program by recording the program in a computer readable recording medium like a hard disk, a flexible disk (FD), a CD-ROM, an MO, or a DVD and reading out the program from the recording medium with the computer.

As explained above, according to the embodiments, it is possible to easily and efficiently prevent occurrence of an overflow and reduce a waste of a calculation by checking whether a value of the volatility is extremely small. Moreover, it is possible to prevent an overflow from occurring by multiplying a value of the power function having a large absolute value and a value of a cumulative density function in a range of 0 to 1 first. Furthermore, it is possible to efficiently calculate the value of the product of the power function and the equation for the cumulative density function of the standard normal distribution.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A numerical calculation device that calculates a value of any one of an option premium and an option risk indicator or both related to a barrier option, the numerical calculation device comprising:
a computer that receives parameters input by a user;
a memory that stores the parameters received by the computer;
a magnitude relation judging unit that judges a magnitude relation between an interest rate $r_d$ of first currency and an interest rate $r_f$ of second currency by the computer, the interest rate $r_f$ and the interest rate $r_d$ being used for a calculation of any one of the option premium and a magnitude relation between the option risk indicator or both related to the barrier option, and that judges, only when the interest rate $r_f$ is greater than the interest rate $r_d$, a magnitude relation between a value of a volatility v and a predetermined value, the value of the volatility being used for a calculation of any one of the option premium and the option risk indicator or both related to the barrier option and the predetermined value; and
a calculation executing unit that executes a calculation of the value of any one of the option premium and the option risk indicator or both related to the barrier option by referring to the parameters stored in the memory only when the value $r_f$ is not greater than the value $r_d$ or the value of a volatility is greater than or the same as the predetermined value by the computer, wherein
the calculation executing unit selects, an approximation formula (1-1) or (1-2)

$$N(d) = \frac{1}{\sqrt{2\pi}} \int_{-\infty}^{d} e^{-\frac{x^2}{2}} dx \cong \begin{cases} -\frac{1}{\sqrt{2\pi}\,d} e^{-\frac{d^2}{2}}, & \text{when } d < -\sqrt{a} \quad (1\text{-}1) \\ 1 - \frac{1}{\sqrt{2\pi}\,d} e^{-\frac{d^2}{2}}, & \text{when } d > \sqrt{a} \quad (1\text{-}2) \end{cases}$$

based on whether $d<-\sqrt{a}$ or $d>\sqrt{a}$, where a is an arbitrarily predetermined positive number that determines accuracy of approximation of the equation, x is a variable of integration, and d is a variable of the function N, and the approximation formula being obtained by approximating the equation for the cumulative density function,
the calculation executing unit selects the approximation formula (1-1) or (1-2) as part of a process of calculating a value of a product of a power function $$\left(\frac{s}{c}\right)^{\frac{2(r_f-r_d)T_{1v}}{v^2T_1}-1}$$

and an equation for a cumulative density function of a standard normal distribution where c is a barrier, s is a spot rate greater than c, $T_1$ is a period from an agreement date to an exercise date, and $T_{1v}$ is a period from a spot date of the agreement date to a spot date of the exercise date, and
the calculation executing unit calculates the value of the product based on the approximation formula selected.

2. The numerical calculation device according to claim 1, wherein the predetermined value is 0.0001.

3. The numerical calculation device according to claim 1, wherein the calculation executing unit calculates, in calculating a value of a product of a predetermined equation, the power function, and the equation for the cumulative density function of the standard normal distribution, the value of the product of the predetermined equation, the power function, and the equation for the cumulative density function of the standard normal distribution by calculating a value of a product of the power function and the equation for the cumulative density function of the standard normal distribution and multiplying the value of the product calculated by a value of the predetermined equation for avoiding overflow.

4. A computer-readable recording medium that stores therein a computer program that causes a computer to implement a numerical calculation method of calculating a value of any one of an option premium and an option risk indicator or both related to a barrier option, the computer program causing the computer to execute:
  receiving parameters input by a user;
  storing the parameters received in the receiving in a memory;
  first judging a magnitude relation between an interest rate $r_d$ of a first currency and an interest rate $r_f$ of a second currency, the interest rate $r_d$ and the interest rate $r_f$ being used for the calculation of any one of the option premium and the option risk indicator or both related to the barrier option;
  second judging a magnitude relation between a value of a volatility v and a predetermined value, the value of the volatility being used for the calculation of any one of the option premium and the option risk indicator or both related to the barrier option, the second judging being performed only when the interest rate $r_f$ is greater than the interest rate $r_d$; and
  executing a calculation of the value of any one of the option premium and the option risk indicator or both related to the barrier option by referring to the parameters stored in the memory only when the value $r_f$ is not greater than the value $r_d$ or the value of a volatility is greater than or the same as the predetermined value, wherein
  the executing includes selecting an approximation formula (1-1) or (1-2)

$$N(d) = \frac{1}{\sqrt{2\pi}} \int_{-\infty}^{d} e^{-\frac{x^2}{2}} dx \cong \begin{cases} -\frac{1}{\sqrt{2\pi}\, d} e^{-\frac{d^2}{2}}, & \text{when } d < -\sqrt{a} \quad (1\text{-}1) \\ 1 - \frac{1}{\sqrt{2\pi}\, d} e^{-\frac{d^2}{2}}, & \text{when } d > \sqrt{a} \quad (1\text{-}2) \end{cases}$$

based on whether $d < -\sqrt{a}$ or $d > \sqrt{a}$, where a is an arbitrarily predetermined positive number that determines accuracy of approximation of the equation, x is a variable of integration, and d is a variable of the function N, and the approximation formula being obtained by approximating the equation for the cumulative density function, the selecting being performed as part of the process of calculating a value of a product of a power function $$\left(\frac{S}{c}\right)^{\frac{2(r_f - r_d)T_{1v}}{v^2 T_1} - 1}$$

and an equation for a cumulative density function of a standard normal distribution where c is a barrier, s is a spot rate greater than c, $T_1$ is a period from an agreement date to an exercise date, and $T_{1v}$ is a period from a spot date of the agreement date to a spot date of the exercise date, and
  the executing includes calculating the value of the product based on the approximation formula selected.

5. The computer-readable recording medium according to claim 4, wherein the predetermined value is 0.0001.

6. The computer-readable recording medium according to claim 4, wherein the executing includes calculating, in calculating a value of a product of a predetermined equation, the power function, and the equation for the cumulative density function of the standard normal distribution, the value of the product of the predetermined equation, the power function, and the equation for the cumulative density function of the standard normal distribution by calculating a value of a product of the power function and the equation for the cumulative density function of the standard normal distribution and multiplying the value of the product calculated by a value of the predetermined equation for avoiding overflow.

7. A numerical calculation method of calculating a value of any one of an option premium and an option risk indicator or both related to a barrier option, the numerical calculation method comprising:
  receiving parameters input by a user by a computer;
  storing the parameters received by the computer in a memory;
  first judging a magnitude relation between an interest rate $r_d$ of a first currency and an interest rate $r_f$ of a second currency by the computer the interest rate $r_d$ and the interest rate $r_f$ being used for the calculation of any one of the option premium and the option risk indicator or both related to the barrier option;
  second judging a magnitude relation between a value of a volatility v and a predetermined value by the computer, the value of the volatility being used for the calculation of any one of the option premium and the option risk indicator or both related to the barrier option, the second judging being performed only when the interest rate $r_f$ is greater than the interest rate $r_d$, and
  executing a calculation of the value of any one of the option premium and the option risk indicator or both related to the barrier option by the computer by referring to the parameters stored in the memory option by referring to the parameters stored in the memory only when the value $r_f$ is not greater than the value $r_d$ or the value of a volatility is greater than or the same as the predetermined value, wherein
  the executing includes selecting an approximation formula (1-1) or (1-2)

$$N(d) = \frac{1}{\sqrt{2\pi}} \int_{-\infty}^{d} e^{-\frac{x^2}{2}} dx \cong \begin{cases} -\frac{1}{\sqrt{2\pi}\, d} e^{-\frac{d^2}{2}}, & \text{when } d < -\sqrt{a} \quad (1\text{-}1) \\ 1 - \frac{1}{\sqrt{2\pi}\, d} e^{-\frac{d^2}{2}}, & \text{when } d > \sqrt{a} \quad (1\text{-}2) \end{cases}$$

based on whether $d < -\sqrt{a}$ or $d > \sqrt{a}$, where a is an arbitrarily predetermined positive number that determines accuracy of approximation of the equation, x is a variable of integration, and d is a variable of the function N, and the approximation formula being obtained by approximating the equation for the cumulative density function, the selecting being performed as part of the process of calculating a value of a product of a power function $$\left(\frac{S}{c}\right)^{\frac{2(r_f - r_d)T_{1v}}{v^2 T_1} - 1}$$

and an equation for a cumulative density function of a standard normal distribution where c is a barrier, s is a spot rate greater than c, $T_1$ is a period from an agreement date to an exercise date, and $T_{1v}$ is a period from a spot date of the agreement date to a spot date of the exercise date, and
  the executing includes calculating the value of the product based on the approximation formula selected.

8. The numerical calculation method according to claim 7, wherein the predetermined value is 0.0001.

9. The numerical calculation method according to claim 7, wherein the executing includes calculating, in calculating a value of a product of a predetermined equation, the power function, and the equation for the cumulative density function of the standard normal distribution, the value of the product of the predetermined equation, the power function, and the equation for the cumulative density function of the standard normal distribution by calculating a value of a product of the power function and the equation for the cumulative density function of the standard normal distribution and multiplying the value of the product calculated by a value of the predetermined equation for avoiding overflow.

* * * * *

UNITED STATES PATENT AND TRADEMARK OFFICE
CERTIFICATE OF CORRECTION

PATENT NO. : 7,650,302 B2  Page 1 of 1
APPLICATION NO. : 11/369912
DATED : January 19, 2010
INVENTOR(S) : Takayuki Nakayama It is certified that error appears in the above-identified patent and that said Letters Patent is hereby corrected as shown below:

Column 12, Line 15, change "selects," to --selects--.

Column 14, Line 12, change "computer" to --computer,--.

Column 14, Line 22, change "$r_d$," to --$r_d$;--.

Signed and Sealed this

Thirteenth Day of April, 2010

David J. Kappos
*Director of the United States Patent and Trademark Office*